(12) United States Patent
Schlak

(10) Patent No.: US 8,917,064 B2
(45) Date of Patent: Dec. 23, 2014

(54) CONTROL CIRCUIT FOR POWER DISTRIBUTION SWITCH

(75) Inventor: Robert B. Schlak, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 356 days.

(21) Appl. No.: 13/527,978

(22) Filed: Jun. 20, 2012

(65) Prior Publication Data

US 2013/0342174 A1 Dec. 26, 2013

(51) Int. Cl.
*H02J 7/04* (2006.01)

(52) U.S. Cl.
USPC ........... 320/162; 320/163; 320/164; 320/165; 320/166; 320/167

(58) Field of Classification Search
USPC ................. 320/107–109, 116, 137, 149, 152, 320/160–167
See application file for complete search history.

(56) References Cited

U.S. PATENT DOCUMENTS

| | | | |
|---|---|---|---|
| 6,130,813 | A | 10/2000 | Kates et al. |
| 7,741,821 | B2 | 6/2010 | Schlak |
| 7,830,036 | B2 | 11/2010 | Wei et al. |
| 7,929,323 | B2 | 4/2011 | Schmidt |
| 8,766,602 | B1 * | 7/2014 | Kimes ........................... 320/137 |
| 2008/0137238 | A1 | 6/2008 | Wright et al. |

| | | | |
|---|---|---|---|
| 2008/0297959 | A1 | 12/2008 | Tanabe et al. |
| 2011/0309809 | A1 | 12/2011 | Rao et al. |
| 2012/0019287 | A1 | 1/2012 | Brumett, Jr. et al. |

FOREIGN PATENT DOCUMENTS

WO WO 2009/088156 A1 7/2009

OTHER PUBLICATIONS

Ahmed et al., "Design and Implementation of PFM Mode High Efficiency Boost Regulator", Analog Integr. Circ. Sig. Process (Aug. 4, 2011).

* cited by examiner

*Primary Examiner* — Paul Dinh
(74) *Attorney, Agent, or Firm* — Margaret McNamara, Esq.; Kevin P. Radigan, Esq.; Heslin Rothenberg Farley & Mesiti P.C.

(57) ABSTRACT

A control circuit is provided which includes a pre-charge circuit connected in parallel with a solid state switching device of, for example, a power distribution network. The pre-charge circuit pre-charges a load capacitance at a load side of the switching device prior to activation of the switching device. The pre-charge circuit includes a threshold waveform generation circuit and an over-current detect circuit. The threshold waveform generation circuit synthesizes a maximum acceptable charging waveform for the pre-charge circuit in charging the load capacitance, and the over-current detect circuit signals an over-current fault condition upon a charging current through the pre-charge circuit exceeding the synthesized, maximum acceptable charging waveform. The pre-charge circuit includes a sense resistor coupled to a power input side of the solid state switching device, with charging current through the pre-charge circuit being monitored via the sense resistor.

20 Claims, 7 Drawing Sheets

CONTROL CIRCUIT FOR POWER DISTRIBUTION SWITCH

BACKGROUND

Power distribution circuits provide power to other circuits, and protect both the power source and load of the power distribution circuit from an over-current fault. These circuits, which are also referred to as soft-switches, hot swap controllers, or electronic circuit breakers, provide on/off control, inrush control, and over-current protection. Typically, one or more power metal-oxide-semiconductor field-effect transistors (MOSFETs) and control circuitry are provided.

By way of example, in power systems for high-density servers, high voltage DC power distribution is controlled with electronic switches (e.g., MOSFETs) to isolate load faults and to provide desired system availability. Since loads of the MOSFET circuit are typically capacitive, high power dissipation can occur when a MOSFET is first enabled. If the MOSFET(s) is soft-started, then simultaneous current and voltage drops occur. This high power and energy through the MOSFET can cause the MOSFET to fail.

Two different approaches exist to making a power distribution circuit more robust; that is, use of a customized soft-start circuit or a pre-charge circuit. With customized soft-start circuitry, during soft-start, the main switching MOSFET is in the linear region of operation. However, advances in MOSFET technology, such as high transconductance, optimize switching performance, while sacrificing linear region robustness. Thus, is it increasingly difficult to find MOSFETs suitable for linear mode operation. One particularly beneficial soft-start approach is described in commonly assigned, U.S. Pat. No. 7,741,821 B2. In the conventional pre-charge circuit approach, the load side of the one or more switching MOSFETs of the power distribution circuit may be pre-charged through a startup resistor. An additional startup MOSFET may also be used to enable the startup resistor. In operation, this startup MOSFET is typically switched on instantaneously, thus avoiding linear mode operation. Disadvantageously, today's pre-charge circuits can be complex, costly, and large.

BRIEF SUMMARY

In accordance with an aspect of the present invention, a control circuit is provided which includes a pre-charge circuit connected in parallel with a solid state switching device. The pre-charge circuit pre-charges, at least partially, a load capacitance at a load side of the solid state switching device prior to activation of the solid state switching device, and includes: a threshold waveform generation circuit synthesizing a maximum acceptable charging waveform for the pre-charge circuit in charging the load capacitance; and an over-current detect circuit, the over-current detect circuit signaling an over-current fault condition upon a charging current through the pre-charge circuit exceeding the synthesized, maximum acceptable charging waveform.

In another aspect, a control circuit is provided which comprises a solid state switching device, and a pre-charge circuit connected in parallel with the solid state switching device. The pre-charge circuit pre-charges, at least partially, a load capacitance at a load side of the solid state switching device prior to activation of the solid state switching device, and includes: a threshold waveform generation circuit synthesizing a maximum acceptable charging waveform for the pre-charge circuit in charging the load capacitance; a sense resistor coupled to a power input side of the solid state switching device, wherein a charging current through the pre-charge circuit is sensed via the sense resistor; and an over-current detect circuit, the over-current detect circuit signaling an over-current fault condition upon the charging current through the pre-charge circuit exceeding the synthesized, maximum acceptable charging waveform.

In a further aspect, a method is provided which comprises: providing a pre-charge circuit connected in parallel with the solid state switching device, the pre-charge circuit pre-charging, at least partially, a load capacitance at a load side of the solid state switching device to facilitate activation of the solid state switching device, and comprising: a threshold waveform generation circuit synthesizing a maximum acceptable charging waveform for the pre-charge circuit in charging the load capacitance; and an over-current detect circuit, the over-current detect circuit signaling an over-current fault condition upon a charging current through the pre-charge circuit exceeding the synthesized, maximum acceptable charging waveform.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
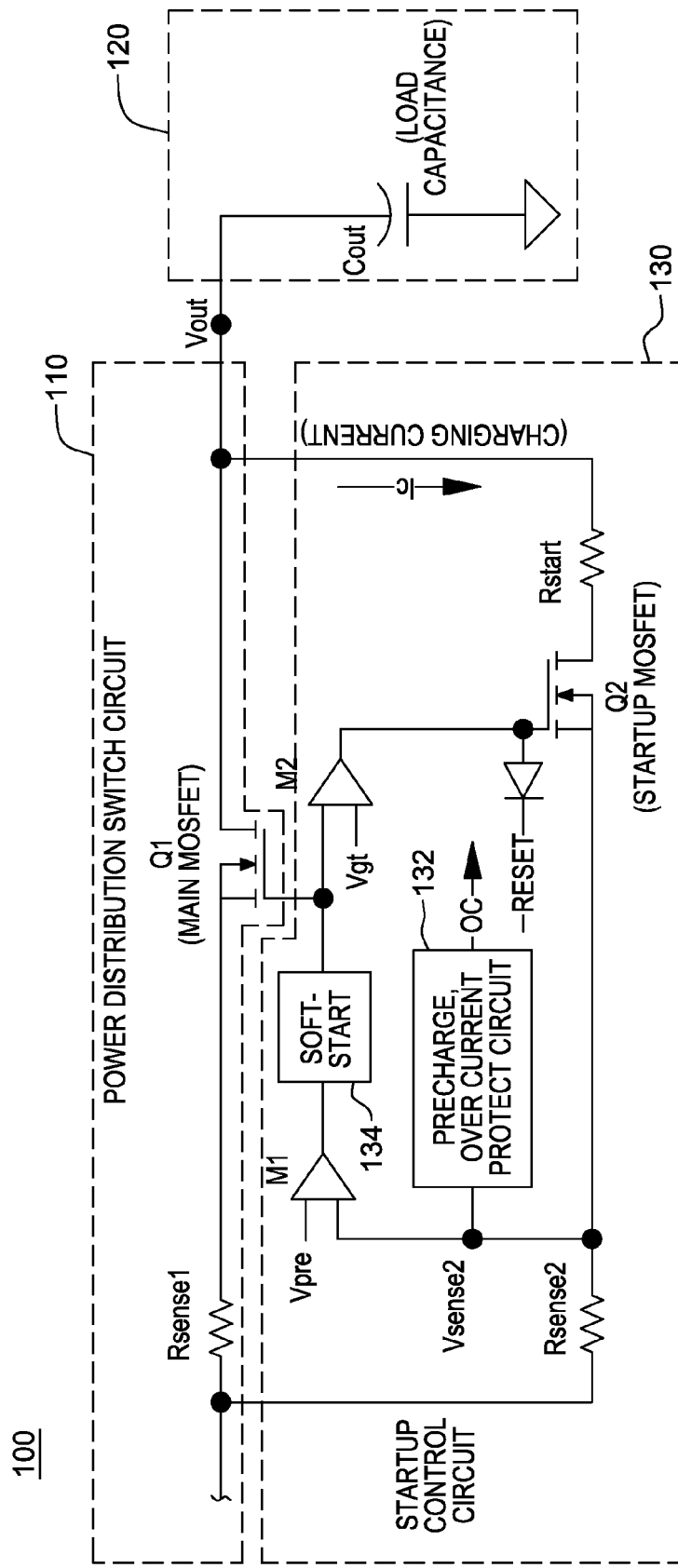
FIG. 1 is a schematic diagram illustrating one embodiment of a control circuit, in accordance with one or more aspects of the present invention.

Generally stated, disclosed herein a control circuit and method for facilitating activation of a power distribution circuit by pre-charging, at least partially, the load capacitance at a load side of a power distribution switch of the circuit. In one embodiment, the power distribution circuit is a DC power distribution circuit. By way of example, FIG. 1 depicts one embodiment of a control circuit 100 comprising a power distribution switch circuit 110 with a load capacitance 120 coupled to an output thereof, and a startup control circuit 130 facilitating activating or switching on power distribution switch circuit 110. As illustrated, power distribution switch circuit 110 includes a sense resistor (Rsense1) for sensing current through a solid state switching device Q1 of the switch circuit, and capacitance load 120 is a load capacitance (Cout) at the load side of the solid state switching device. In one example, the solid state switching device Q1 is a main MOSFET of the control circuit. As shown, startup control circuit 130 is coupled in parallel with power distribution switch circuit 110. As explained further herein, startup control circuit 130 facilitates activation of a solid state switching device Q1 by, at least partially, pre-charging the load capacitance 120, and then soft-starting the solid state switching device, while providing over-current protection in the case of an over-current fault condition, for example, due to a short circuit fault or a capacitive overload.

In normal operation of the control circuit, there are three phases to startup, that is, to enabling of the solid state switching device Q1 of power distribution switch circuit 110. Initially, a startup transistor Q2, such as a startup MOSFET, and a startup resistor (Rstart) pre-charge the output (Vout) of power distribution circuit 110. During this phase, if a pre-charge, over-current protect circuit 132 of startup control circuit 130 detects an over-current fault condition, then the protect circuit latches the startup control circuit 130 off to minimize the energy during a fault condition.

In one embodiment, once pre-charge is complete, the solid state switching device Q1 is soft-started via a soft-start circuit 134 of startup control circuit 130. As illustrated, this soft-start circuit is coupled to the gate of the solid state switching device Q1. Pre-charge is complete (for instance) when a pre-charge current Ic sensed or monitored via a sense resistor Rsense2 as voltage Vsense2 falls below a predefined threshold (Vpre) for initiating soft-start. This is detected by logic module M1 in the startup control circuit embodiment of FIG. 1. Advantageously, soft-start minimizes any undesirable current spikes due to a difference between the pre-charge voltage and the actual voltage Vout to be supplied by power distribution switch circuit 110 upon activation of the solid state switching device. For instance, if there is any DC load at the time of pre-charge, the resultant pre-charge voltage will be somewhat less than the actual Vout to be supplied by power distribution switch circuit 110. As one example, if the switch circuit is to provide 350 V DC at the output, then the pre-charge voltage might be 300 V due to the load at the time of pre-charge. Once soft-start is completed, the startup transistor Q2 is disabled. This allows the normal current limit functions of the circuit (not shown) to function properly. Completion of soft-start occurs when the solid state switching device Q1 is fully enhanced, with a gate voltage above the turn on threshold (Vgt), which is identified by logic module M2. As illustrated, in one embodiment, the output of logic module M2 is coupled to allow for reset of the gate voltage of startup transistor Q2.

Figure 2:
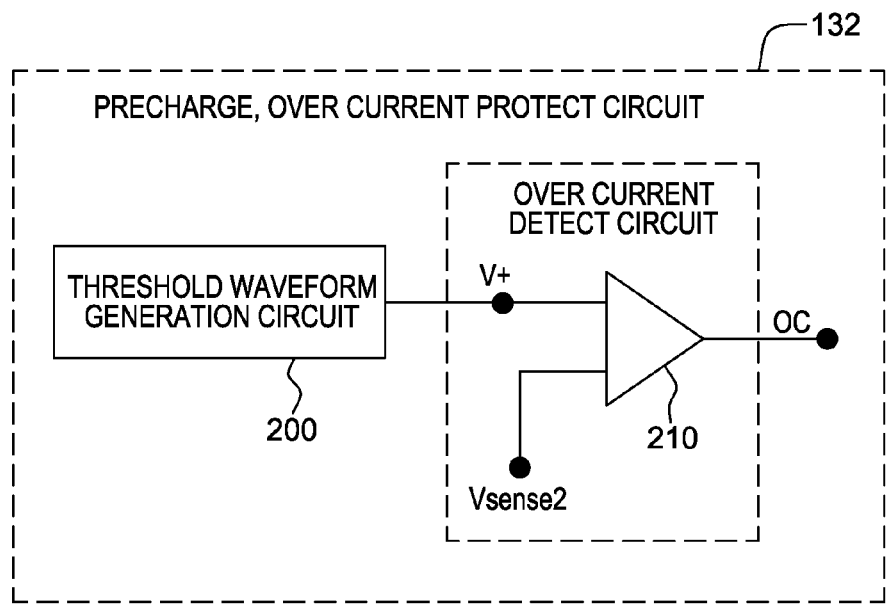
FIG. 2 is a high-level depiction of the pre-charge, over-current protect circuit of FIG. 1, in accordance with one or more aspects of the present invention.

FIG. 2 illustrates one embodiment of pre-charge, over-current protect circuit 132 of startup control circuit 130 of FIG. 1. In this embodiment, pre-charge, over-current protect circuit 132 includes a threshold waveform generation circuit 200 which outputs a synthesized, maximum acceptable charging waveform as a function of time for the pre-charge circuit portion in charging the load capacitance. This synthesized current or voltage waveform, referenced by way of example as V+, is provided to the input of compare logic 210, which compares the synthesized waveform to the contemporaneous, actual pre-charge current or voltage at the sense resistor (Rsense2) of the startup control circuit. The output of compare logic 210 is an over-current signal OC, which is used upon detection of a fault condition to disable activation of the power distribution switch circuit.

Advantageously, the control circuit and method disclosed herein embody simplicity advantages, at lower costs, and smaller circuit sizes than other control circuit implementations. Additionally, the control circuit and method disclosed herein provide superior over-current protection, and can be readily customized to specific circuit requirements. Control is provided herein using a few discrete, analog components.

In comparison, other control circuit solutions typically utilize micro-controllers, which require programming and support logic. Incorporating micro-controllers also means that prior control circuits are more difficult to test and debug, and that larger circuit board space is required, as well as additional bias voltages, etc. Additionally, other control approaches typically result in much greater fault energy, as illustrated herein.

The control circuit described herein advantageously provides precise, over-current pre-charge control, which minimizes the energy during a fault condition. With a startup control circuit as disclosed herein, the size and cost of the startup MOSFET and startup resistor are much smaller than in other solutions. Further, the energy delivery requirements on the source voltage are greatly reduced. The pre-charge circuitry disclosed herein provides many advantages over soft-start solutions only. The pre-charge circuit presented is much more robust, and linear mode operation is not required. Therefore, any MOSFET with suitable voltage, on resistance, and gate drive characteristics can be used. The relaxed MOSFET requirements allow for the use of less expensive MOSFETs from a variety of suppliers.

Figure 3:
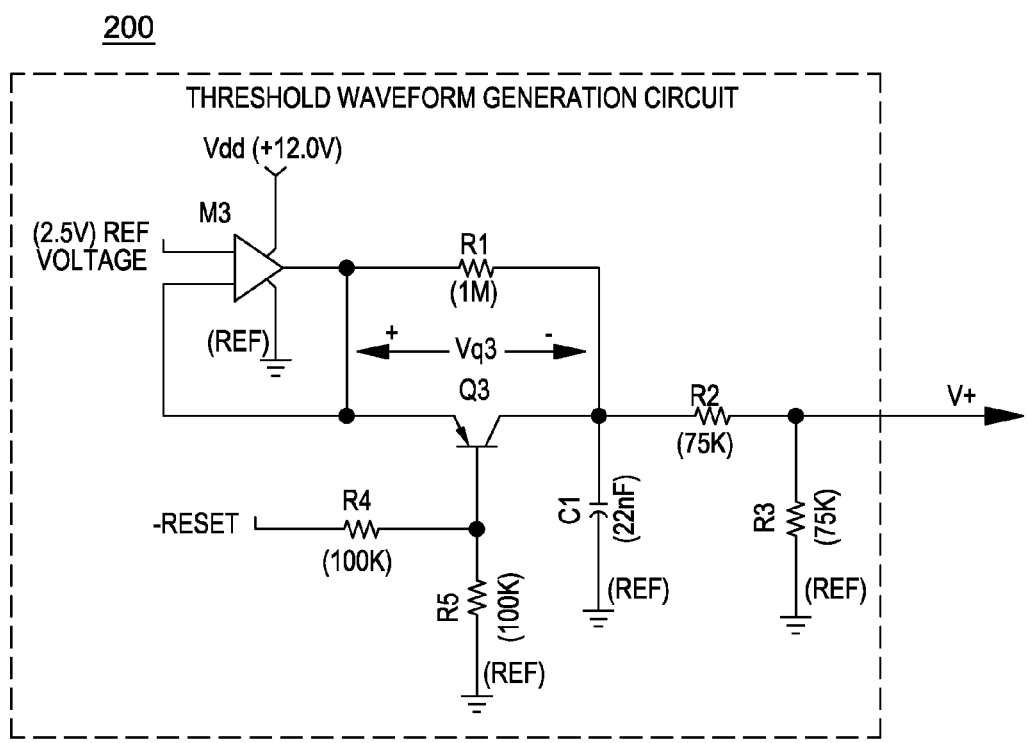
FIG. 3 is a schematic diagram of one embodiment of a threshold waveform generation circuit for the pre-charge, over-current protect circuit of FIG. 2, in accordance with one or more aspects of the present invention.

One embodiment of a threshold waveform generation circuit 200, which may be employed in a pre-charge, over-current protect circuit of a control circuit such as described above in connection with FIGS. 1 & 2, is depicted in FIG. 3. This threshold waveform generation circuit is configured to synthesize a time-varying waveform (such as a current or voltage waveform), equivalent to a maximum acceptable charging current for pre-charging the load capacitance. If the actual pre-charge current, sensed as equivalent voltage Vsense2, exceeds this waveform, then an over-current fault condition is detected. By shutting or latching off with detection of an over-current fault condition, the pre-charge, over-current protect circuit protects the control circuit from damage, and also maintains the integrity of the source voltage to the power distribution switch circuit.

Referring to FIG. 3, when the power distribution switch circuit is off (i.e., −Reset is low), transistor Q3 of threshold waveform generation circuit 200 is on and capacitance C1 is charged rapidly. Capacitance C1, which may comprise 22 nF in one example, is charged to a reference voltage (Vref), such as a 2.5 V reference voltage. Logic module M3 buffers the reference voltage (Vref) so that the reference is not affected by the charging current. The synthesized waveform appears in this example as a voltage V+ at the output of the threshold waveform generation circuit. This voltage is a signal determined in part by resistors R2 and R3. Resistors R2 and R3 are selected so that waveform output V+ is slightly above the equivalent initial pre-charge current required to charge a maximum load capacitance coupled to the control circuit of FIG. 1. Equation 1 below may be employed to determine resistance values, that is, by solving for V+ when the −Reset signal is low:

$$((Vref-VQ3) \times R3)/(R2+R3) > (Vin/Rstart) \times Rsense2 \quad (1)$$

The control circuit enters the pre-charge phase of the power distribution switch circuit when the −Reset signal goes high. When this happens, the startup transistor (Q2 in FIG. 1) is enabled, and the circuit output voltage (Vout in FIG. 1) increases as the load capacitance is charged through Rstart (see FIG. 1). Within the threshold waveform generation circuit 200 of FIG. 3, −Reset going high simultaneously turns transistor Q3 off, resulting in capacitor C1 discharging through resistors R2 and R3, and the signal V+ decaying as a function of time. The rate of decay is determined by the resistance and capacitance values selected, and these values may be chosen so that the rate of decay coincides with the current required to pre-charge the load capacitance. The capacitance and resistance values can be estimated by matching their RC time constant with that of the load (Rstart×Cout). Another method of selecting these values is to use analog circuit simulation, such as Pspice™, available from Cadence Design Systems, San Jose, Calif., U.S.A. Note that it is desirable to select a low capacitance value for capacitor C1, so that the current required to charge C1 is minimized. In one embodiment, transistor Q3 is a bipolar transistor, rather than a MOSFET, to avoid leakage current which would cause variation in the C1 discharge rate. The M2 and M3 logic are described above. Note also that resistor R1 assists with the value of "V+(with −Reset high)", as noted below with respect to Equation 2, and that resistors R4 and R5 allow −Reset to turn transistor Q3 on and off. Resistor R4 is a typical base resistor, which limits the current in transistor Q3, and resistor R5 lowers the voltage at the base of transistor Q3 when −Reset is high.

The resistor values of the threshold waveform generation circuit may be chosen to ensure that the synthesized signal V+ decays to a final value that guarantees in normal operation that the control circuit will not remain in pre-charge state. That is, pre-charge must either complete successfully, or cause an over-current latch off. In addition, the final value of signal V+ should correspond to a charge current that is below the predefined threshold voltage (Vpre) for initiating the soft-start circuit 134 portion of the startup control circuit 130, as noted above in connection with FIG. 1. Equation 2 below may be used to determine these values:

$$V+(\text{with} -Reset\ high) = (Vref \times R3)/(R1+R2+R3) \quad (2)$$

Note with respect to Equation 2 that it is desirable to choose values such that:

$$V+(\text{with} -Reset\ high) < Vpre$$

where Vpre=Ic×Rsense2.

Selecting the preset threshold voltage (Vpre) to initiate soft-starting is a trade-off With a high threshold, the solid state switching device will turn on before the output is fully pre-charged. This results in higher power and energy in the main transistor which, if excessive, could damage the device. With a low threshold, the pre-charge circuit will over-current latch off more readily.

Figure 4:
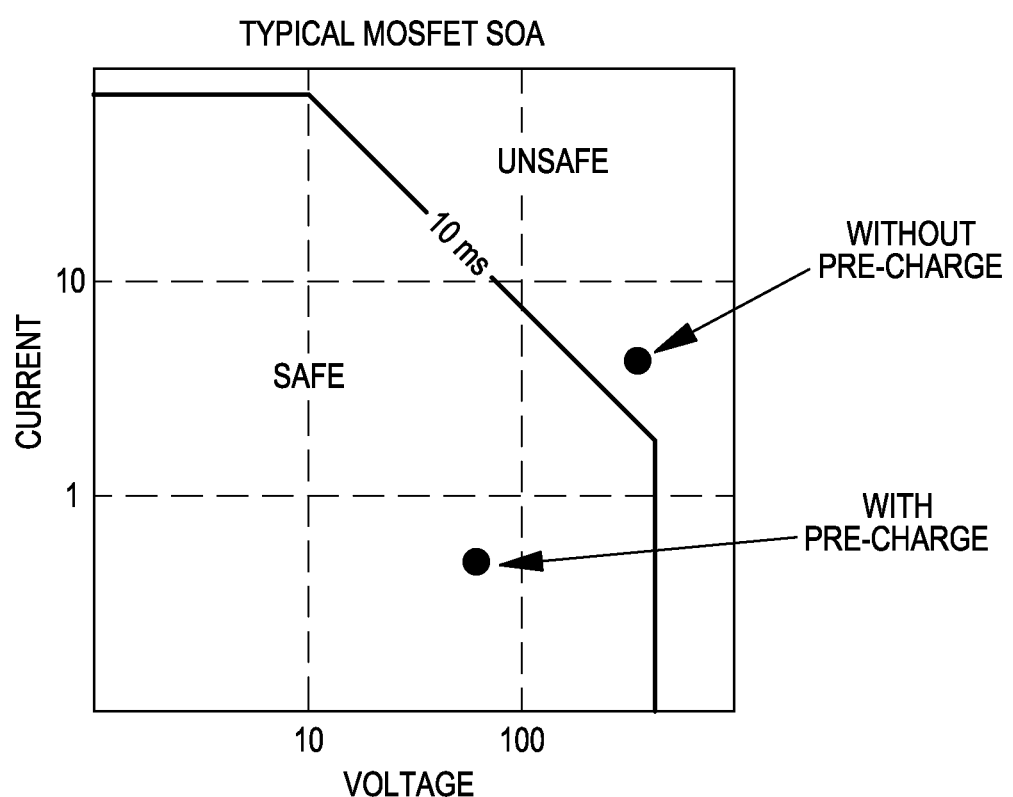
FIG. 4 depicts a typical safe operating area graph for a MOSFET with exemplary power switching shown without pre-charging, and with pre-charging, in accordance with one or more aspects of the present invention.

Referring collectively to FIGS. 1-3, the following example highlights certain benefits of the present solution, and illustrates how the control circuit can be tailored for specific applications. Assume the power distribution switch circuit switches 350 VDC to a load, with maximum capacitance of 100 µF. By way of example, Rsense2 may be chosen to be 0.1 ohm, which results in a good Vsense2 signal range for the pre-charge, over-current protect circuit. Vpre is chosen to be 0.2 volts, which corresponds to an Ic=2 amps through Rsense2. Rstart may be chosen to be 33 ohms, and the main MOSFET Q1 starts up with a Vds voltage of 2 amps×33 ohms=66 volts. By pre-charging the output, the main MOSFET is operated well within its safe operating range, one embodiment of which is depicted in FIG. 4 for a particular time in the startup process. The peak current through the startup MOSFET Q2 is 350 volts/33 ohms=10.6 amps. Only a small surface mount transistor package is thus required. In contrast, conventional pre-charge solutions require larger MOSFETs to handle higher currents for longer times. These larger MOSFETs typically require five times the printed circuit board area, and costs approximately five times more than the solution described herein.

A large resistance is desired for resistor R1 of the threshold waveform generation circuit depicted in FIG. 3. For this resistor, a 1 mega-ohm resistance may be selected. Using R2=R3 satisfies Equation 1. Using Equation 2, R2=R3<95K. Therefore, R2=R3=75K is selected. An initial selection of capacitance C1 is made by matching the output RC time constant (Rstart×Cout=33×100 µF=3.3 msec). This value of capacitance C1 (i.e., 22 nF for this example) can be confirmed by simulation.

Figure 5:
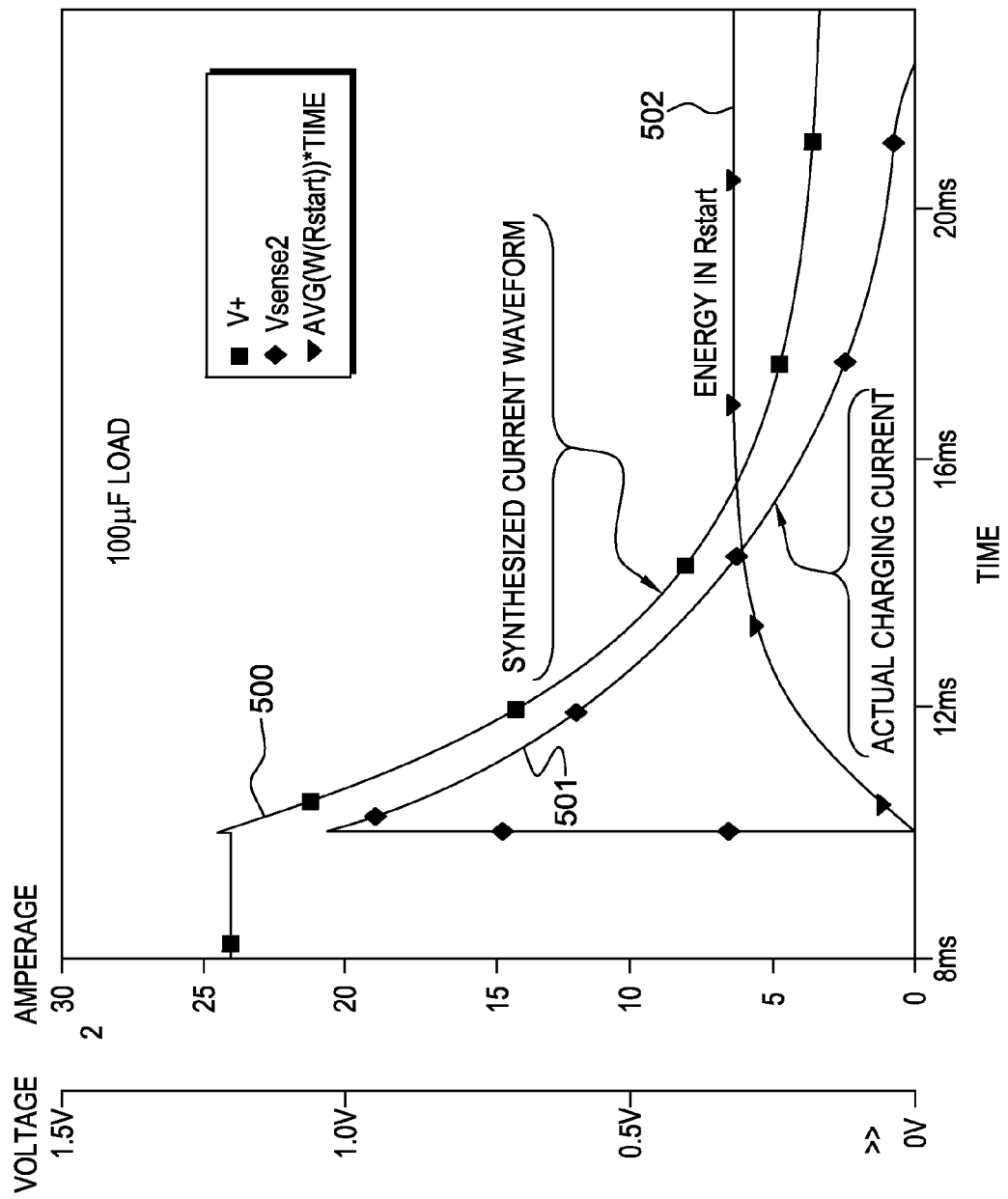
FIG. 5 is a graph illustrating an example of a synthesized, maximum acceptable charging (current or voltage) waveform, an actual contemporaneous pre-charge current or voltage, and resultant energy in a startup resistor of the pre-charge circuit, such as illustrated in FIGS. 1-3, in accordance with one or more aspects of the present invention.

By way of example, FIG. 5 illustrates a synthesized, maximum acceptable charging waveform 500 (e.g., the V+ waveform), and an actual charging current or voltage 501 (e.g., Vsense2) through the pre-charge circuit as a function of time for a maximum output capacitance of 100 µF. The synthesized charging waveform (V+) is ideal because it accurately mimics the actual charging current (Ic) 501 through the pre-charge circuit components. As illustrated in FIG. 5, the energy 502 in the startup resistor (Rstart) remains relatively low during the controlled pre-charge of the load capacitance coupled to the power switching device Q1.

Figure 6:
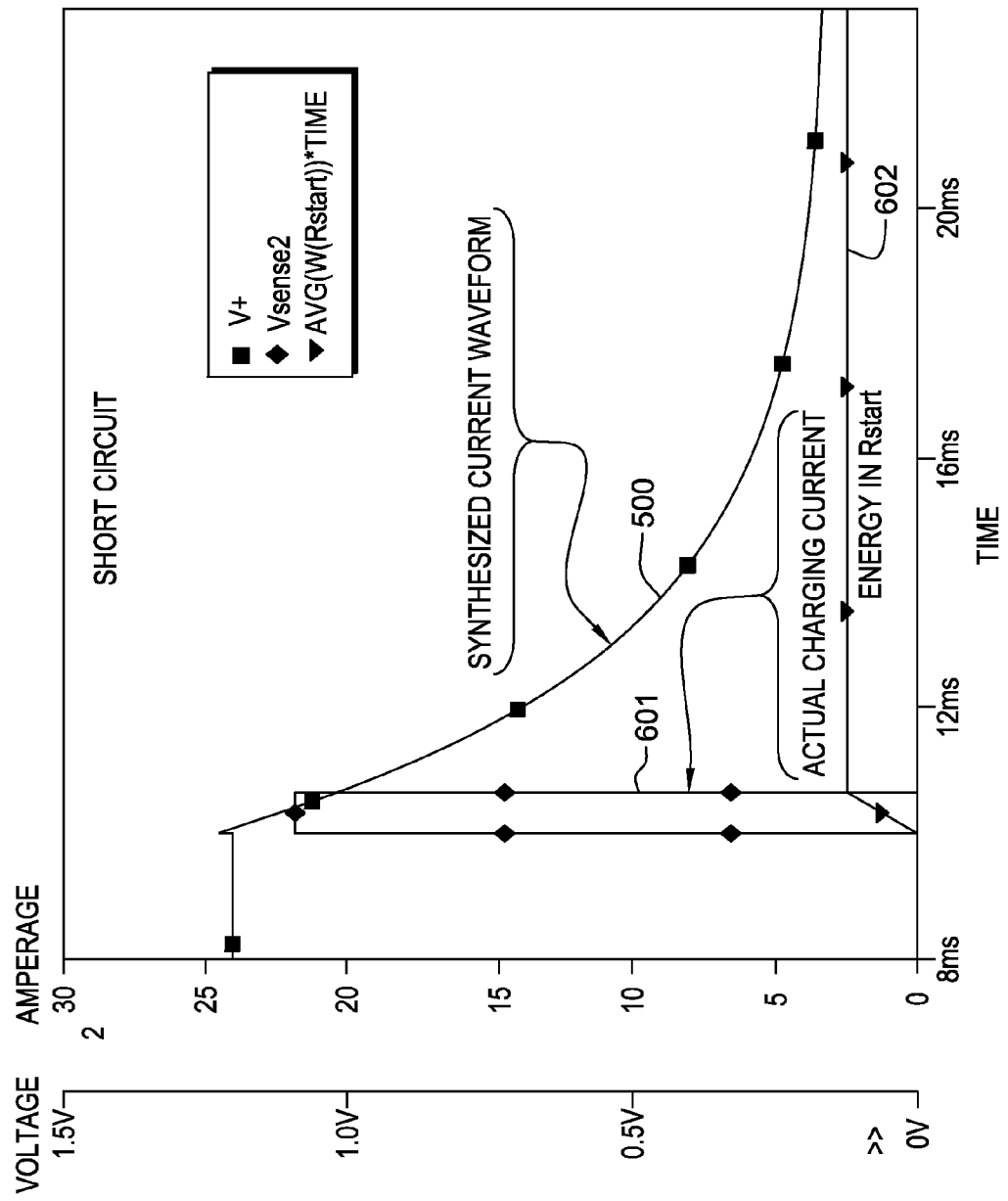
FIG. 6 is a graph illustrating for powering into a short circuit, a synthesized, maximum acceptable charging (current or voltage) waveform, a contemporaneous, actual pre-charge current or voltage depicting the fault condition, and resultant energy in the startup resistor of the pre-charge circuit, in accordance with one or more aspects of the present invention.
Figure 7:
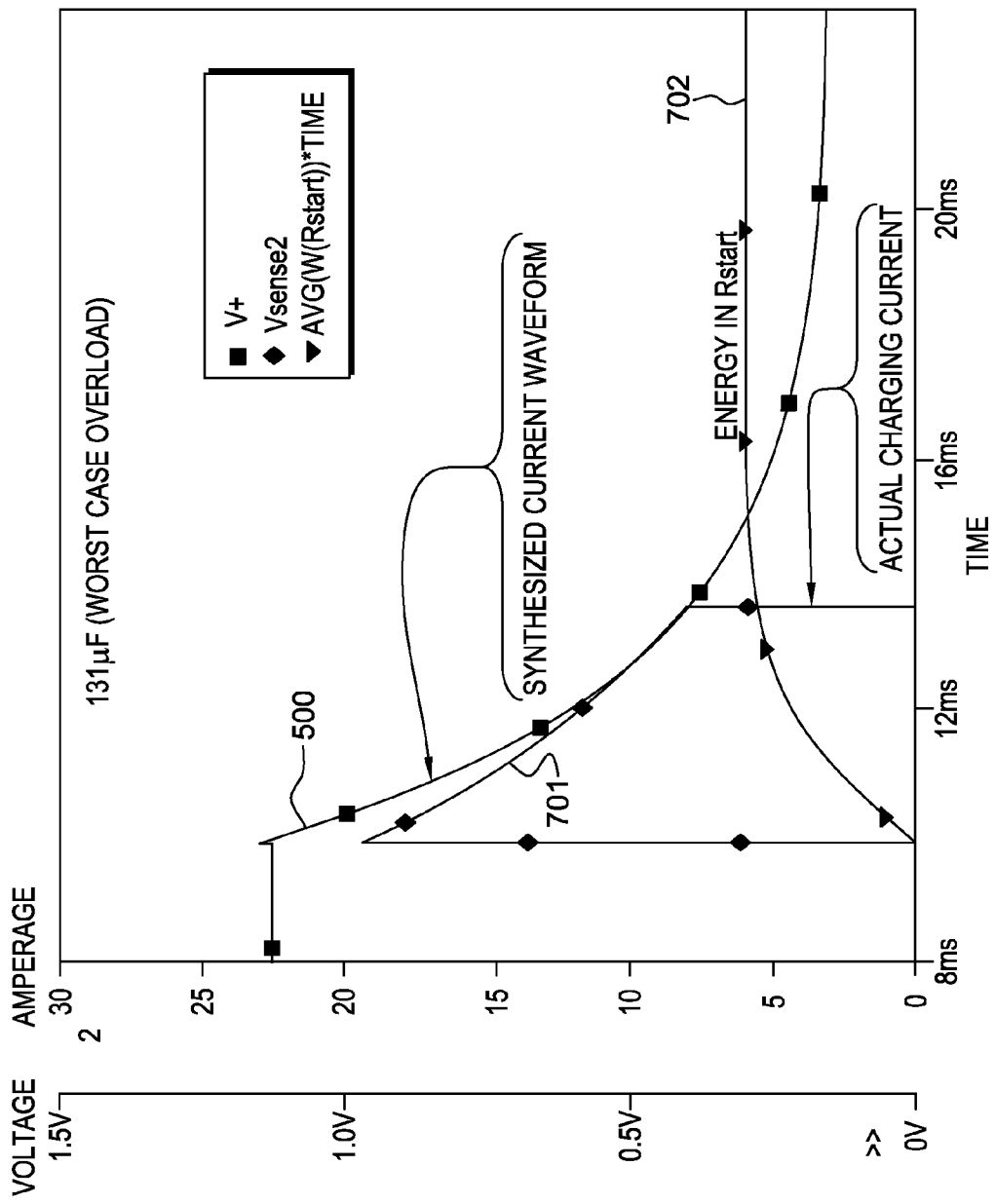
FIG. 7 is a graph illustrating for powering into a capacitive overload, a synthesized, maximum acceptable charging (current or voltage) waveform, a contemporaneous, actual pre-charge current or voltage, shown exceeding the synthesized, maximum acceptable charging waveform, and resultant energy in the startup resistor of the pre-charge circuit, in accordance with one or more aspects of the present invention.

FIGS. 6 & 7 illustrate early shut off of the pre-charge current when powering into a short circuit (FIG. 6) and an excess capacitive load (FIG. 7), respectively. As illustrated in FIG. 6, when powering into a short circuit, the actual pre-charge current 601 quickly exceeds the maximum acceptable charging waveform 500, in which case the startup control circuit is quickly latched off, as explained herein. In this case, the energy 602 in Rstart remains relatively low. In FIG. 7, the pre-charge current 701 is pre-charging into a capacitive overload, which ultimately results in the pre-charge current exceeding the synthesized, maximum acceptable charging waveform 500, and upon exceeding the waveform, shutting down of the pre-charging. Note that even in this case, the energy 702 in Rstart remains relatively low. Conventional pre-charge circuits typically shut off after a significantly longer, fixed time than that illustrated in FIGS. 6 & 7. As such, conventional pre-charge circuits necessarily must be able to handle significantly more (e.g., 4× or more) of the energy in Rstart than for a normal pre-charge operation.

Figure 8:
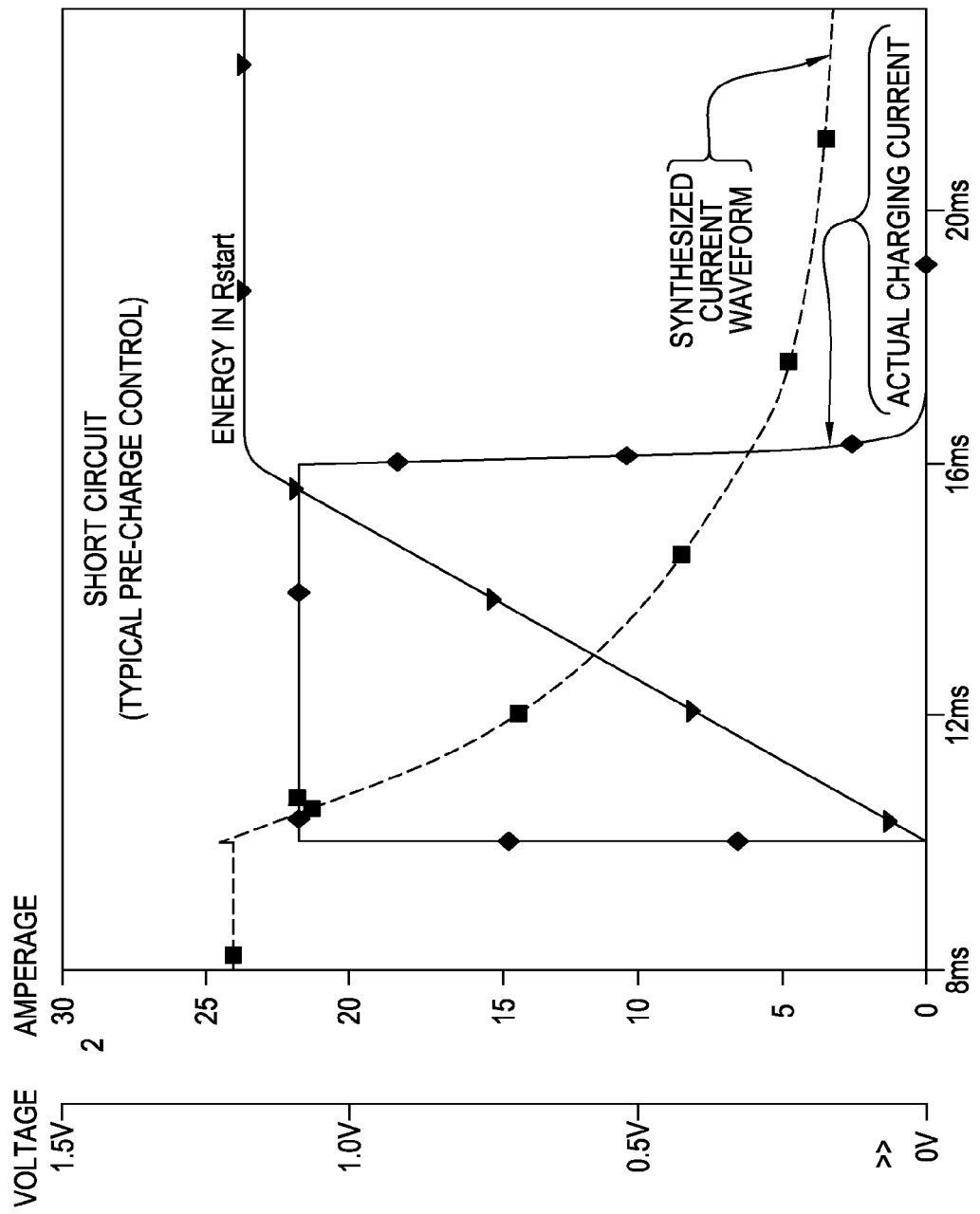
FIG. 8 is a graph illustrating a pre-charge current or voltage with over-current fault condition utilizing a conventional pre-charge circuit, and the resultant energy in the startup resistor of the conventional pre-charge circuit, that is, in a pre-charge circuit without threshold waveform generation and over-current detect, in accordance with one or more aspects of the present invention.

This is illustrated, by way of example, in FIG. 8, where the pre-charge current 801 through a conventional pre-charge circuit is shown to spike and remain high for a significantly longer time interval than pre-charging using a synthesized, maximum current waveform as a reference, as described herein and illustrated, for example, in FIG. 5. Note that in the conventional pre-charge circuit example of FIG. 8, the fault energy 802 in Rstart is also significantly higher than the fault energy level 602 in Rstart using a pre-charge circuit, in accordance with aspects of the present invention. Note also with respect to the conventional circuit, to avoid dipping the input voltage, the source voltage must be capable of providing the extra energy.

The energy required to charge the load capacitance (Cout) is $\frac{1}{2} \times Cout \times V^2 = 6.1$ Joules (in the example discussed herein). Resistance Rstart should be capable of delivering this energy pulse. However, resistance Rstart must also be able to source the energy required during an overload. As seen in FIGS. 5, 6 & 7, the control circuitry described herein minimizes these extra requirements on resistance Rstart. Other pre-charge circuits require resistance Rstart to be a large, expensive positive temperature coefficient (PTC) resistor, since it must be able to handle, for example, 4× more energy. As seen in FIG. 8, the energy in the resistor is around 24 Joules, and such PTC resistors are over 4× larger and more expensive than a simple wire-wound resistor, which may be used in a startup control circuitry such as described herein.

Advantageously, the control circuits presented herein accurately synthesize a maximum acceptable pre-charging waveform, which can be used by a pre-charge, over-current protect circuit to detect and shut off charging of a load capacitance at the load side of the solid state switching device in the case of a fault condition. Additionally, control circuitry size and cost is reduced, and the circuitry can be readily customized to particular application requirements. Separate current sense resistors (e.g., Rsense1, Rsense2) may be employed for the main circuit function and the startup control circuit. The pre-charge sense signal magnitude may thus be readily adjusted for enhanced accuracy, and the main sense signal magnitude may be decreased to minimize power loss. Also, note that the pre-charge current can exceed the normal current limit, thus allowing flexibility in meeting requirements and selecting optimal component values.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope or spirit of the invention. The above-embodiment(s) was chosen and described in order to explain the principles of the invention and the practical application, and to enable others of ordinary skill in the art to understand the invention through various embodiments and the various modifications thereto which are dependent on the particular use contemplated.

What is claimed is:

1. A control circuit comprising:
a pre-charge circuit connected in parallel with a solid state switching device, the pre-charge circuit, at least partially, pre-charging a load capacitance at a load side of the solid state switching device to facilitate activation of the solid state switching device, and comprising:
a threshold waveform generation circuit synthesizing a maximum acceptable charging waveform for the pre-charge circuit in charging the load capacitance; and
an over-current detect circuit, the over-current detect circuit signaling an over-current fault condition upon a charging current through the pre-charge circuit exceeding the synthesized, maximum acceptable charging waveform.

2. The control circuit of claim 1, wherein the synthesized, maximum acceptable charging waveform varies as a function of time during pre-charging of the load capacitance.

3. The control circuit of claim 2, wherein the over-current detect circuit signals the over-current fault condition based on an instantaneous charging current through the pre-charge circuit exceeding a current maximum acceptable charging level of the synthesized, maximum acceptable charging waveform.

4. The control circuit of claim 1, wherein the synthesized, maximum acceptable charging waveform comprises a maximum acceptable charging level which decreases as a function of time during pre-charging of the load capacitance.

5. The control circuit of claim 1, wherein the pre-charge circuit further comprises a sense resistor coupled to a power input side of the solid state switching device, the charging current being sensed via the sense resistor.

6. The control circuit of claim 5, wherein the pre-charge circuit further comprises:
a startup transistor connected in series with the sense resistor; and
a startup resistor connected in series with the startup transistor and to the load side of the solid state switching device.

7. The control circuit of claim 6, further comprising a circuit adapted to control the startup transistor based, at least in part, on a voltage measurement at the series connection of the sense resistor and the startup transistor.

8. The control circuit of claim 6, wherein the solid state switching device comprises a first metal-oxide-semiconductor field-effect transistor, and the startup transistor comprises a second metal-oxide-semiconductor field-effect transistor.

9. The control circuit of claim 1, wherein the over-current detect circuit disables the pre-charge circuit with signaling of the over-current fault condition.

10. The control circuit of claim 1, wherein the pre-charge circuit further comprises a sense resistor coupled to a power input side of the solid state switching device, the charging current being sensed via the sense resistor, and wherein the control circuit further comprises:
a soft-start circuit soft-starting the solid state switching device upon completion of pre-charge of the load capacitance, wherein completion of pre-charge occurs when the charging current drops below a preset threshold.

11. The control circuit of claim 10, wherein the synthesized, maximum acceptable charging waveform decays as a function of time to a level below the preset threshold to initiate, in normal operation, soft-starting of the solid state switching device by the soft-start circuit after pre-charging of the load capacitance.

12. A control circuit comprising:
a solid state switching device;
a pre-charge circuit connected in parallel with the solid state switching device, the pre-charge circuit pre-charging, at least partially, a load capacitance at a load side of the solid state switching device to facilitate activation of the solid state switching device, and comprising:
a threshold waveform generation circuit synthesizing a maximum acceptable charging waveform for the pre-charge circuit in charging the load capacitance;
a sense resistor coupled to a power input side of the solid state switching device, wherein a charging current through the pre-charge circuit is monitored via the sense resistor; and
an over-current detect circuit, the over-current detect circuit signaling an over-current fault condition upon the charging current through the pre-charge circuit exceeding the synthesized, maximum acceptable charging waveform.

13. The control circuit of claim 12, wherein the synthesized, maximum acceptable charging waveform varies as a function of time during pre-charging of the load capacitance.

14. The control circuit of claim 13, wherein the over-current detect circuit signals the over-current fault condition based on an instantaneous charging current through the pre-charge circuit exceeding a current maximum acceptable charging level of the synthesized, maximum acceptable charging waveform.

15. The control circuit of claim 12, wherein the sense resistor of the pre-charge circuit is a second sense resistor, and wherein the control circuit further comprises a first sense resistor connected in series with the power input side of the solid state switching device for sensing current through the solid state switching device, wherein the series connected first sense resistor and solid state switching device are connected to a DC power bus of a power distribution network.

16. The control circuit of claim 12, wherein the pre-charge circuit further comprises:
a startup transistor connected in series with the sense resistor; and
a startup resistor connected in series with the startup transistor and to the load side of the solid state switching device.

17. The control circuit of claim 16, further comprising a circuit adapted to control the startup transistor based, at least in part, on a voltage measurement at the series connection of the sense resistor and the startup transistor.

18. The control circuit of claim 17, wherein the solid state switching device comprises a first metal-oxide-semiconductor field-effect transistor, and the startup transistor comprises a second metal-oxide-semiconductor field-effect transistor, and wherein the over-current detect circuit disables the pre-charge circuit with signaling of the over-current fault condition.

19. The control circuit of claim 12, further comprising a soft-start circuit soft-starting the solid state switching device upon completion of pre-charge of the load capacitance, wherein completion of pre-charge occurs when the charging current drops below a preset threshold, and wherein the synthesized, maximum acceptable charging waveform decays as a function of time to a level below the preset threshold initiate, in normal operation, soft-starting of the solid state switching device by the soft-start circuit after pre-charging of the load capacitance.

20. A method comprising:
providing a pre-charge circuit connected in parallel with a solid state switching device, the pre-charge circuit pre-charging, at least partially, a load capacitance at a load side of the solid state switching device to facilitate activation of the solid state switching device, and comprising:
a threshold waveform generation circuit synthesizing a maximum acceptable charging waveform for the pre-charge circuit in charging the load capacitance; and
an over-current detect circuit, the over-current detect circuit signaling an over-current fault condition upon a charging current through the pre-charge circuit exceeding the synthesized, maximum acceptable charging waveform.

* * * * *